United States Patent Office 3,474,016
Patented Oct. 21, 1969

3,474,016
PREPARATION OF VINYLMERCAPTANS
Harry E. Gunning, Edmonton, Alberta, Canada, assignor to Esso Research and Engineering Company, a corporation of Delaware
No Drawing. Filed Jan. 21, 1965, Ser. No. 427,118
Int. Cl. B01j 1/10; C07c 3/24
U.S. Cl. 204—162
14 Claims

ABSTRACT OF THE DISCLOSURE

This invention relates to a process for the selective formation of vinyl thiols by reacting hydrogen sulfide with acetylenic compounds in the presence of a free radical initiator. A critical feature of this invention is the molar ratio of $H_2S$ to the acetylenic compound present in the reaction zone. It has been discovered that a stoichiometric excess of $H_2S$ favors the selective formation of the desired vinyl mercaptans. This reaction is preferably carried out in a reaction vessel having chemically passive, nonpolar internal surfaces.

---

This invention relates to a novel free radical reaction for the preparation of unsaturated organic sulfur compounds. More particularly, this invention relates to a novel free radical reaction between hydrogen sulfide and acetylenic compounds to selectively produce vinyl thiols. In one preferred embodiment this invention relates to the selective preparation of vinyl mercaptan by a free radical reaction between hydrogen sulfide and acetylene.

The free radical addition of hydrogen sulfide to olefinic compounds is known in the art and has been found to give quantitative yields of saturated mono- and di-thiol adducts of the starting olefinic reactant. It was not believed, however, that free radical reactions of acetylenic compounds with hydrogen sulfide could be carried out in a manner which would result in the selective production of thiol adducts possessing vinylic unsaturation. The production of vinylic thiols in quantitative yields is of significant interest since these difunctional compounds would be valuable chemical intermediates in the production of polymer materials and in addition possess properties which would render them potentially attractive as agricultural chemicals.

It is an object of this invention to provide a selective free radical reaction for the production of vinyl thiols.

It is another object of this invention to selectively produce vinyl mercaptan by the free radical reaction of acetylene with hydrogen sulfide.

It has now been discovered that the above-described objects may be accomplished by reacting acetylenic compounds with hydrogen sulfide in an oxygen-free environment in the presence of a free radical initiator under critical, carefully controlled reaction conditions so as to result in the production of vinyl thiols as the major reaction product.

The overall reaction contemplated by this invention may be schematically represented as follows:

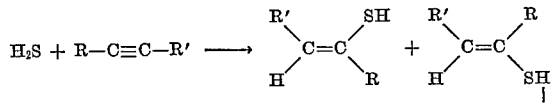

As can be readily seen the major products of the reaction are the cis and trans isomers of the vinylic thiol.

The R and R′ groups, of the above-represented acetylenic compounds, which may be employed as starting materials in the reaction may be the same or different and can be selected from any of the following:

R and/or R′=H
=halogen or pseudo halogen, e.g., F, Cl, Br, CN.
=$C_1$ to $C_6$, preferably $C_1$ to $C_4$ alkyl group, e.g., methyl, ethyl, propyl, butyl.
=$C_6$ to $C_{18}$, preferably $C_6$ to $C_{14}$ aryl group, e.g., phenyl, naphthyl, phenanthryl.
=$C_7$ to $C_{18}$, preferably $C_7$ to $C_{15}$ alkylaryl group, e.g., tolyl, mesityl, nonylphenyl, butylnaphthyl.
=$C_1$ to $C_9$, preferably $C_1$ to $C_5$ substituted alkyl group, e.g., chloropropyl, nitroamyl, hydroxymethyl, carboxymethyl.
=$C_6$ to $C_{18}$, preferably $C_6$ to $C_{15}$ substituted aryl or alkylaryl group, e.g., bromonaphthyl, nitrotolyl, chlorononylphenyl.
=$C_1$ to $C_{10}$, preferably $C_1$ to $C_4$, carboxylic acid group, e.g., carboxyl, carboxymethyl.
=$C_1$ to $C_{17}$, preferably $C_1$ to $C_{12}$, substituted carboxylic acid group, e.g., carboethoxy, carbomethoxybutyl.

The preferred acetylenic feedstocks to be employed in this invention are those compounds wherein R and/or R′ are hydrogen, halo groups or psuedo halo groups such as the cyanogen (CN) group. The most preferred feedstock is acetylene (R and R′=H) since it results in the selective production of vinyl mercaptan which product is a potentially valuable chemical intermediate heretofore unobtainable.

As previously described in this specification, the process of this invention is normally carried out in the presence of a free radical type initiator. The utilization of a mild free radical initiator source is a critical feature of this invention. The useable free radical initiators are peroxidic compounds, azo compounds and ultraviolet light with the last being preferred since it reduces the possibility of introducing impurities into the reaction system. The wave length of the ultraviolet light preferably employed in the reaction is normally in the range of 2,000 to 3,000 angstrom units although the reaction may be carried out using wave lengths in the range of 1,800 to 3,200 angstrom units. A wide variety of peroxidic or azo compounds may be employed in this reaction. Typical examples of such compounds are cumene hydroperoxide, tertiary butyl hydroperoxide, bis-tertiary butyl peroxide, benzoyl peroxide, bis-azo-isobutyronitrile, peracetic acid, acetyl peroxide, azoacetic acid, ethyl azeoacetate, ethyl azomalonate.

When free radical initiator compounds are employed in the reaction they will normally constitute 0.01 to 0.5 wt. percent, preferably 0.01 to 0.10 wt. percent, based on acetylenic compound in the reaction mixture.

The molar ratio of the $H_2S$ to the acetylenic compound is a critical feature of this invention. It has been discovered that the utilization of a stoichiometric excess of $H_2S$ favors the selective formation of the desired vinyl mercaptans. Specifically, this invention contemplates the utilization of 1.5 to 100 moles, preferably 2 to 20 moles of $H_2S$ per mole of acetylenic compound in the reaction mixture.

The reaction conditions are another critical feature of this invention. While the reaction is normally capable of being carried out in either the liquid or gas phase under a wide range of temperatures, pressures and reaction times, the utilization of certain reaction conditions has an important effect on the selectivity of the reaction for producing the desired product. In one preferred embodiment, the reaction of $C_2H_2$ with $H_2S$, the utilization of gaseous reactants is extremely critical since the likelihood of explosion when operating in the liquid phase is particularly great. For small scale laboratory experiments, however, no explosion occurs in the liquid phase when the acetylene feed is employed in less than 16 mole percent concentrations.

When operating in the liquid phase with substituted acetylenic compounds as feedstocks, the temperature and pressure of the reaction are dictated by the boiling points of the reactants. Thus, when the reaction is carried out at atmospheric pressure the temperature of reaction must be in the range of $-61°$ C. to $-100°$ C., preferably $-65°$ to $-80°$ C. It will be apparent to those skilled in the art, however, that the application of pressure to the reaction system will raise the boiling points of the reactants and therefore make possible a liquid phase reaction at substantially higher temperatures than those described above. For example, pressures of 30 to 3000 p.s.i.g. and preferably 300 to 2200 p.s.i.g. would make possible the use of temperatures in the range of $-70°$ C. to $+95°$ C., preferably $+20°$ C. to $+80°$ C., while still maintaining a liquid phase reaction system. These pressures apply only when employing the substituted acetylenes, since acetylene itself is dangerous to handle at pressures above 20 p.s.i.g.

As previously noted, the reaction may also be carried out in the gas phase as well as the liquid phase and under certain conditions the utilization of the former may be preferable. This is particularly true of gas phase reactions which are carried out under conditions which will yield a liquid vinyl mercaptan product which is easily separated, as formed, from the gaseous reactants. Thus, for example, the reaction of $H_2S$ with $C_2H_2$ produces vinyl mercaptan ($CH_2$=CHSH) having a boiling point of $60°$ C. It will be necessary, therefore, that the reaction of the above-described reactants at atmospheric pressure be maintained at temperatures below $60°$ C., preferably $-10°$ C. to $+25°$ C. to produce the desired liquid product while maintaining the reactants in the gas phase. It will be equally clear to those skilled in the art that the reaction is amendable to higher temperatures and pressures while still maintaining the reactants in the gas phase and recovering a liquid vinylic thiol product. Thus, for example, depending upon the nature of the starting acetylenic reactants, temperatures in the range of $-40°$ C. to $+80°$ C., preferably $-20°$ C. to $+20°$ C. and pressures in the range of 5 to 3000 p.s.i.g., preferably 10 to 2200 p.s.i.g. are employable in the reaction.

While the reaction is normally carried out in the absence of any additional inert solvent, it is possible to employ inert solvents in the reaction. The utilization of a solvent is of particular advantage in the reaction of hydrogen sulfide and acetylene since it can serve to minimize the danger of explosion when working with the reactants in the liquid phase. Typical inert solvents which may be employed in the reaction are halo hydrocarbons such as perfluorinated, saturated hydrocarbons, which have a boiling point above $0°$ C., for example perfluorokerosene; water; alcohols; ethers; and paraffinic hydrocarbons such as neopentane.

Although the reaction may be carried out in a batch or continuous operation, the contact time of the reactants in either instance must be carefully controlled since vinylic mercaptans are extremely reactive monomers, and decomposition will occur by the action of the initiators and/or ultraviolet light, if their concentration is allowed to build up to high levels in the reaction system. Thus, the range of conversion is 0.1 to 40%, preferably 4 to 10%, with contact time in the range of from 10 to 300 seconds, preferably 10 to 200 seconds.

An additional critical feature of this invention, particularly when preparing vinyl mercaptan from acetylene and hydrogen sulfide, is the nature of the reaction vessel. It has been found that the surface of most reaction vessels are polarized to some extent by deformation of the crystalline structure of which they are composed. This deformation has the effect of creating slightly positive and slightly negative sites on the vessel surface. It has further been found that a characteristic of most sulfuric compounds in their affinity for being adsorbed on polar surfaces. It is now believed that SH radicals associated with $H_2S$ in the reaction system are not only adsorbed on the vessel surfaces but in addition are split due to the effect of the polar surface on the sulfur-hydrogen bond. The free radicals thereby formed are responsible for the autopolymerization of the desired vinylic mercaptan into undesired products.

It has now been found that the tendency for autopolymerization can be eliminated and the selectivity for the production of vinylic mercaptans may be enhanced by the utilization of reaction vessels having chemically passive nonpolar surfaces. The term "chemically passive, nonpolar surface" as employed in this specification denotes a surface which has been neutralized so as to minimize positive or negative surface sites at which free radicals are formed and autopolymerization takes place as defined in the last preceding paragraph. Examples of the types of reaction surfaces which may be employed in this invention are amorphous surfaces such as Teflon or other polyfluorohydrocarbon surfaces. In addition, a normally unsuitable surface such as glass, fused quartz, Vycor glass and Pyrex glass may be rendered suitable for use in the reaction by treatment of the surface with a 5 weight percent solution of hydrofluoric acid followed by washing with deionized water and drying. Another alternative method of achieving the necessary chemically passive surface is by treatment of a metal surface such as stainless steel with fuming nitric acid followed by washing with deionized water and drying.

The invention will be further understood by reference to the following illustrative examples.

EXAMPLE I

This experiment was performed in a cylindrical, quartz reaction vessel, 5 cm. in diameter, 10 cm. in length at $25°$ C. The surfaces of the vessel were untreated.

1260 mm. of $H_2S+140$ mm. of $C_2H_2$ was irradiated with an unfiltered ultraviolet (Hanovia Model 30620 medium pressure quartz mercury lamp) source for 30 minutes. The wave length of ultraviolet light was 1850 to 2000 A. At the end of the experiment excess reactants were distilled off at $-130°$ C. 41 micromols of condensable products remained. In addition, about 130 micromols of solid thioacetaldehyde trimer remained in the reaction vessel. Mass spectrometric analysis of the condensable product showed it to contain 80 mole percent of vinyl mercaptan. The result indicates that vinyl mercaptan may be selectively produced in a gas phase reaction.

EXAMPLE II

An additional experiment similar to Example I was carried out utilizing 700 mm. of $H_2S$ and 700 mm. of $C_2H_2$. In this case a mist of higher molecular weight products was formed within several minutes after exposing the cell to the ultraviolet source. The mist contained both the trimer and the dimer of vinyl mercaptan. By increasing the ratio of $H_2S/C_2H_2$, as in Example I, the mist formation was prevented. This experiment indicates the criticality of the reactant ratio in the production of vinyl mercaptan.

EXAMPLE III

The vinyl mercaptan product of Example I was stored in glass tubes. After standing for a period of time, analysis of the product indicated that a substantial amount of the vinyl mercaptan product was polymerized. Other product samples were stored in glass and Pyrex tubes which were pretreated with a 5 weight percent solution of HF. Analysis indicated that polymerization was markedly inhibited. This example indicates the criticality of treating the reaction vessels so as to produce a chemically passive, nonpolar surface.

EXAMPLE IV

A cylindrical fused quartz reaction vessel, 5 cm. in diameter and 2 cm. in length was used. It was fully immersed in a Dry-Ice acetone bath. Irradiation was effected through the flat window of the ceil, immersed in the bath, by a Hanovia, Model 30620, medium pressure mercury arc, positioned about 10 inches above the cell. To prevent warming of the cell by IR emission from the lamp, a quartz plate was interposed between the cell and the lamp.

About 15 ml. of liquid $H_2S$ was introduced to the above cell and 3 ml. of liquid $C_2H_2$ added. After 1.5 hours of irradiation, 1.0 ml. of liquid remained in the cell as the excess reactants were distilled off at −130° C. This was then distilled at −64° C. and analyzed by gas chromatography on an 8 ft. tricresyl phosphate-on-firebrick column at 35° C. Three peaks appeared on the chromatogram which were identified as $C_2H_5SH$ (ret. time 7.5 minutes), $C_2H_3SH$ (9.2 minutes) and acetone (14.2 minutes). The acetone was an impurity in the acetylene. The vinyl mercaptan fraction was re-run on a 16 ft. silicone-550 with 2% stearic acid on Kromat CE column which allowed the separation of the small amount of $CS_2$ present from the vinyl mercaptan. The percentage peak area composition of the 1 ml. of liquid was: 62% acetone, 33% vinyl mercaptan, 4.5% $C_2H$-SH and 0.5% $CS_2$. A very small amount of nonvolatile oil was also formed.

It was found to be necessary to immerse the reaction vessel completely in the cooling bath to minimize the danger of explosion. This created a thin layer of acetone on the surface of the reaction vessel which owing to the strong absorption coefficient of acetone, decreased the incident light intensities. The apparent quantum yield of the reaction, as estimated from the lamp characteristics (140 w. input, maximum 2 w. output in the $H_2S$— absorbing region, i.e. $\lambda < 3000$ A.) and the geometrical arrangement of the cell lamp assembly, was about 15. The true quantum yield was probably 4 to 5 times higher.

When the same experiment was attempted but with an acetylene to hydrogen sulfide molar ratio of 1:1, severe explosion occurred after a few minutes irradiation. No explosion occurred, however, when the acetylene concentration did not exceed 16 mole percent.

This experiment demonstrates the liquid phase production of vinyl mercaptan as well as the criticality of employing a molecular excess of $H_2S$.

EXAMPLE V

An experiment with methyl acetylene was carried out employing the technique of Example IV. However, it was not necessary to immerse the reaction vessel completely into the cooling bath, since methyl acetylene is considerably less explosive than acetylene.

5 ml. of liquid methyl acetylene and 15 ml. of liquid $H_2S$ was introduced to the reaction vessel and irradiated for 20 minutes. The noncondensable product, hydrogen, which amounted to 0.065 millimole was removed at −196° C. After distilling off the excess reactants at −98° C., 0.6 ml. of liquid remained. This could be distilled at −64° C., with only a small amount of oily residue remaining. The volatile fraction was then transferred to the sample tube of a gas chromatograph unit by in vacuo distillation and analyzed on an 8 ft. tricresyl phosphate-on-firebrick column at 35° C. The separated components were trapped from the gas chromatograph effluents and collected for identification. In addition to traces of substrates dissolved in the product three components appeared on the chromatogram. The first peak, a $C_4H_6$ hydrocarbon, which was an impurity in the methyl acetylene, eluted in 5.2 minutes from the column, the second, $CS_2$, in 8.0 minutes and the third peak, the propene-1-thiol, in 12.3 minutes. The composition for the whole sample in peak area percentage was: $C_4H_6$ (12%), $CS_2$ (1%) and $CH_3CH=CHSH$ (87%).

Thus, the total yield of the propenethiol, (methyl vinyl mercaptan) assuming a density of 0.9 g. ml.$^{-1}$, is about 0.4 g. or $5 \times 10^{-3}$ mole, and the quantum yield was estimated to be about 100.

EXAMPLE VI

An experiment similar to Example V was carried out employing 0.1% of t-butyl peroxide as the reaction initiator in lieu of ultraviolet radiation. Methyl vinyl mercaptan was detected as a reaction product.

Having thus described the general nature and specific embodiments of the invention, the true scope will now be pointed out by the appended claims.

What is claimed is:

1. A process for selectively preparing a vinylic mercaptan which comprises reacting an acetylenic compound having the formula:

wherein R and R' are selected from the group consisting of hydrogen, halogen, pseudo halogen, $C_1$ to $C_4$ alkyl, $C_6$ to $C_{14}$ aryl and $C_7$ to $C_{15}$ aryl radicals, with 2 to 20 moles, of $H_2S$ per mole of said acetylenic compound at a temperature in the range of −70° C. to +95° C. in the presence of a free radical initiator, the reaction being carried out in a reaction vessel having chemically passive, non-polar internal surface, and recovering a vinylic mercaptan product.

2. The process of claim 1 wherein said acetylenic compound is acetylene.

3. The process of claim 2 wherein said free radical initiator is ultraviolet light.

4. The process of claim 1 wherein said acetylenic compound is methyl acetylene.

5. The process of claim 4 wherein said free radical initiator is ultraviolet light.

6. The process of claim 1 wherein the reaction time is maintained between 10 and 300 seconds.

7. The process of claim 1 wherein said internal surfaces are treated with a 5 weight percent solution of hydrofluoric acid.

8. The process of claim 1 wherein said free radical initiator is selected from the group consisting of peroxidic compounds and azo compounds.

9. The process of claim 8, wherein said acetylenic compound is acetylene.

10. The process of claim 8 wherein said acetylenic compound is methyl acetylene.

11. A process for selectively preparing vinyl mercaptan which comprises reacting hydrogen sulfide with acetylene in the gas phase in a reaction vessel having chemically passive, non-polar internal surfaces, 1.5 to 100 moles of $H_2S$ being present in the reaction system per mole of acetylene, at a temperature in the range of −40° C. to +80° C. in the presence of ultraviolet light for a period of 10 to 300 seconds and recovering liquid vinyl mercaptan as the major reaction product.

12. The process of claim 11 wherein said liquid vinyl mercaptan product is continuously withdrawn as formed.

13. The process of claim 11 wherein said internal surfaces are treated with a 5 wt. percent solution of hydrofluoric acid prior to the admission of the gaseous reactants to the reaction.

14. A process for selectively preparing vinyl mercaptan which comprises reacting hydrogen sulfide with acetylene in the liquid phase in a reaction vessel having chemically passive, non-polar internal surfaces, said acetylene comprising less than 16 mole percent of the reaction mixture, at a temperature of −70° C. to +95° C. and a pressure of not more than 20 p.s.i.g. in the presence of ultraviolet light for a period of 10 to 300 seconds and recovering vinyl mercaptan as the major reaction product.

References Cited

UNITED STATES PATENTS 2,398,479  4/1946  Vaughan et al. _____ 204—158
2,352,435  6/1944  Hoeffelman et al. ____ 260—609
2,411,961  12/1946  Evans et al. _____ 204—162

OTHER REFERENCES

Stacey et al., J.A.C.S., vol. 85 (April 1963), pp. 963–965.

HOWARD S. WILLIAMS, Primary Examiner

U.S. Cl. X.R.

204—158; 260—609